Jan. 15, 1952     A. N. IKNAYAN     2,582,701
ANTISKID TREAD AND METHOD OF MANUFACTURE
Filed July 22, 1949

INVENTOR.
ALFRED N. IKNAYAN
BY Henry P. Truesdell
ATTORNEY.

Patented Jan. 15, 1952

2,582,701

UNITED STATES PATENT OFFICE 2,582,701

ANTISKID TREAD AND METHOD OF MANUFACTURE

Alfred N. Iknayan, Indianapolis, Ind., assignor to United States Rubber Company, New York, N. Y., a corporation of New Jersey Application July 22, 1949, Serial No. 106,114

8 Claims. (Cl. 152—211)

This invention relates to anti-skid treads for pneumatic tires and to a method of making same. In particular the invention relates to a tire tread having incorporated therein particles of materials for the purpose of improving the anti-skid characteristics of the tire, as well as to a method of treating the particles to improve their incorporation in the rubber.

It has heretofore been proposed to incorporate salt crystals in tire treads. As the tire wears down, the salt crystals become exposed and the salt either breaks up or dissolves in the presence of moisture so as to leave a multiplicity of cavities in the tire tread. These minute cavities provide the improvement in the tread surface resulting in better anti-skid properties. In order to mix salt crystals with a rubber composition for a tire tread, the operation is usually carried on in a mill or Banbury mixer. The rubber composition is first warmed up on a mill and the salt crystals are added directly to the warmed rubber composition. It has been found extremely difficult to cause the salt crystals to stay in associated relationship with the rubber composition, since the salt crystals have little affinity toward the rubber. The crystals readily drop off from the rubber or are expelled with force from the composition during the mixing operation. As a result, large quantities of salt crystals become scattered throughout the working area and present a hazard to the operator. Furthermore, it is difficult to maintain a predetermined quantity of salt crystals in composition with the rubber.

The incorporation of the salt crystals in the tire tread may be used in the original manufacture of pneumatic tires or it may be incorporated with worn tires in recapping or retreading operations. In the latter use, the salt crystals are mixed with the rubber composition known as camelback, which comprises the unvulcanized rubber composition strip which is manufactured expressly for the purpose of forming a new tread when worn tires are recapped or retreaded.

I have found that salt crystals can be easily processed with rubber if the crystals are first coated with a thin layer of rubber and glue composition. By this practice, the thin rubber and glue layer which encases the salt crystals functions to retain loose particles of the crystals and to prevent breaking up of the crystals into smaller units. Most important is the new surface condition which surrounds the salt crystal making it compatible with the principal rubber composition. Salt crystals which are coated with a layer of rubber and glue composition readily associate themselves with the rubber and provide a composition which does not separate from the main body of rubber. The crystals adhere firmly to the rubber and do not drop loose with the result that there is no loss of salt crystals. Also, the crystals do not form hazards by becoming sprinkled over the floor area in the vicinity of the mixing mill. In addition, there is a more positive assurance that the desired quantity of salt crystals will be present in the final composition. The method of coating the salt crystals as hereinafter described is efficiently and economically accomplished.

These and other advantages of the invention appear more fully in the following detailed description when considered in connection with the accompanying drawing, in which.

Figure 1:
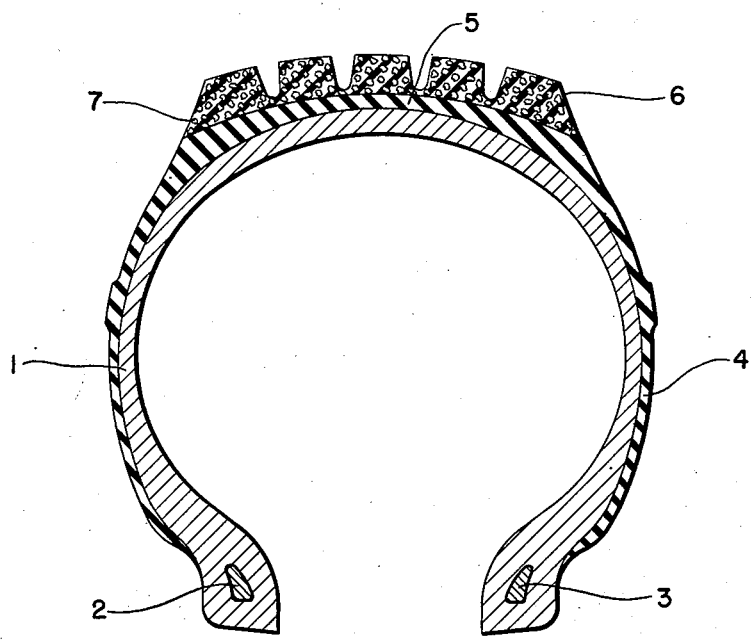
Figure 1 is a transverse view, in section, of a pneumatic tire having a tread embodying the features of my invention.

With reference to the drawing and, in particular, to Figure 1, I show an embodiment of my invention in the form of a pneumatic tire comprising a carcass 1 of strain resisting elements anchored to substantially inextensible bead wires 2 and 3. A layer of rubber composition 4 encases the side wall portions of the carcass and an original tread 5 extends over the crown portion of the carcass. The tire as thus described is conventional in all respects and the tread portion 5 is illustrated in a worn down condition at which state it is desirable to retread the tire.

Instead of providing a conventional retread rubber composition, I employ a material in the form of a rubber composition including salt particles, usually in crystalline form. The layer of rubber 6 forming the retread is usually identified in the trade as camelback. In order to provide a tread having more desirable characteristics with particular reference to anti-skid properties, I incorporate with the camelback a quantity of salt crystals 7 dispersed throughout the composition of the camelback.

The salt crystals 7 are water soluble and usually consist of common rock salt; that is, sodium chloride, although any other suitable water-soluble salt may be used, typically the inorganic halide salts, such as halides of sodium, potassium, calcium, or ammonium. Organic salts, such as citrates, may also be used. The size of the crystals should be such that approximately 72% of the salt will pass through a 16 mesh screen; or of such size that the major portion of the particles will be between a screen size of from 10 to 20 mesh.

Before the salt crystals are incorporated with the rubber composition of the camelback, they are coated with a thin layer of rubber and glue composition. This we have found to be an important requirement in that the adhesion between the salt crystals and the rubber composition of the tread makes it possible to obtain a uniform dispersion of the crystals throughout the tread rubber. Also, the processing of the combination of the crystals with the tread rubber is facilitated and further it is possible to obtain a better control of the quantity of crystals which are incorporated with the tread.

Figure 2:
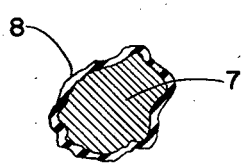
Figure 2 is a representation, in sectional view, of an enlarged salt crystal particle illustrating a rubber and glue coating surrounding the crystal.

In treating the salt crystals, the operation is carried on in much the same manner as pills are coated. A quantity of salt is placed into a tumbling type of coating pan. The pan is rotated while the coating composition is slowly added. Throughout this operation, heated air is forced into the tumbling pan to facilitate drying. At the end of the tumbling and drying operation, the salt crystals remain as individual units having a dry coating or layer of rubber composition completely surrounding each crystal. Figure 2 illustrates, in section, an enlarged view of a crystal 7 having a rubber and glue coating composition 8 forming an encasement for the crystal 7.

The composition from which the desired rubber and glue coating 8 is deposited on the crystals 7 consists of a suitable solution or dispersion of rubber, such as natural rubber latex, GR-S latex, i. e., latex of synthetic rubber consisting of a rubbery copolymer of butadiene with styrene, etc., in admixture with a water soluble glue, such as bone glue, fish glue, blood glue, casein, or other protein glue. The rubber latex and the glue are preferably mixed in such proportions that the coating composition contains substantially equal parts by weight of glue and rubber solids, although other proportions may be used, e. g., from 2 to 8 parts of glue and correspondingly from 8 to 2 parts of rubber solids may be present per 10 parts of combined glue and rubber solids.

The amount of coating composition that is added to the salt crystals is sufficient to provide at least a thin coating on the crystals. For example, the coating solution may be added to the salt in amount sufficient to provide 0.5 to 5%, and preferably about 1.5%, of adhesive solids (glue and rubber solids) based on the weight of the salt crystals. Heavier coatings of rubber than this may be deposited on the salt if desired, but are generally not necessary.

The following example illustrates the invention in more detail.

Example

To each 300 pounds of salt crystals, I provide a coating composition consisting essentially of the following:

6 lbs. butadiene-styrene copolymer rubber latex (50% rubber solids)
3 lbs. talc
5 lbs. glue solution The glue solution is made up separately from the above batch and added to the latex. The glue solution consists essentially of:

22 lbs. dry ground bone glue (trade designation, C-2 Amber)
22 lbs. water
14 ozs. caustic soda
1 oz. dye The purpose of the dye is merely to provide a color so that it can be determined by visual inspection whether or not the salt crystals are completely coated. After the coating operation, the salt crystals are provided with a non-tacky surface and except for the color of the dye do not appear physically different from the salt before it is treated with the coated layer.

Figure 3:
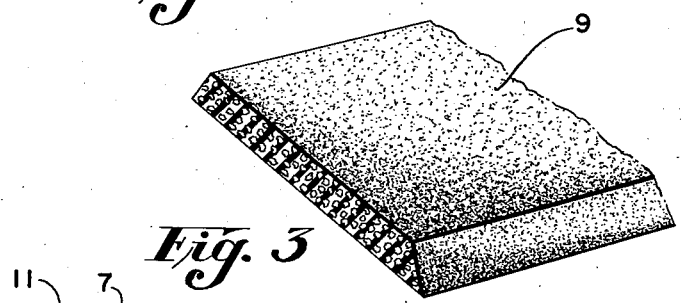
Figure 3 is a perspective view, in section, of a portion of a strip of camelback having salt crystals embedded therein.

The amount of coated salt crystals added to the rubber composition is equal to from 20% to 35% of the weight of the rubber composition of the tread. This quantity of coated salt is added to the rubber composition at the mixing mill or at a Banbury. The formulation of the rubber composition itself forms no part of the present invention, and any conventional natural or synthetic rubber formulations may be employed. The mixing operation is continued until a substantially uniform dispersion of the salt crystals is obtained. Thereafter the rubber composition incorporating the salt is passed through an extruder in which the tread portion of camelback is extruded into final shape. Figure 3 illustrates a completed strip of unvulcanized camelback 9 after leaving the tuber.

After the salt containing camelback is completed, it is applied to a worn tire such as in Figure 1 and vulcanized to form the finished tread 6.

Figure 4:
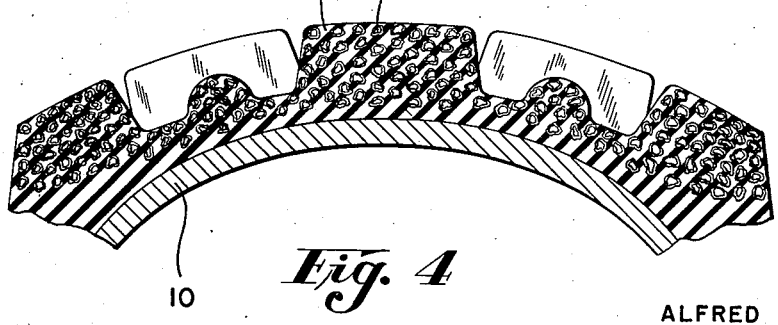
Figure 4 is a transverse view, in section, of a portion of a pneumatic tire illustrating the application of salt crystals to the tread portion of a conventional pneumatic tire.

Although Figures 1 and 3 refer to the application of salt crystals to camelback, it is to be understood that the treads of original pneumatic tires may be formed in a substantially similar manner. Figure 4 illustrates a portion of a pneumatic tire comprising in particular a tire carcass 10 having a tread portion 11 of rubber composition which includes coated salt crystals 7 similar to that previously described. It is conventional practice in the formation of treads for pneumatic tires to employ a composite tread formed in a dual tubing operation. By this arrangement, the salt crystals can then be associated only with the road engaging portion of the tread.

As thus shown and described, it is believed apparent that I have provided a novel arrangement of salt crystals and a tire tread in which each crystal becomes firmly associated with the rubber composition of the tread and in which better distribution of the salt crystals can be obtained due to the compatibility of the surface of the coated crystals with the remaining composition of the tread. Further, I have provided a novel coating step by which the salt crystals are rendered receptive to the rubber stock and by which the salt crystals are prevented from being forcibly expelled from the stock while it is being processed. Hence the salt crystals are prevented from flying about the work room and falling into other batches of rubber or into items of equipment where their presence is unwanted and deleterious.

It should be noted that although the treatment of the salt particles with a rubber and glue coating composition improves the incorporation of the salt in the rubber tread stock, it does not in any way prevent the salt from being voided from the stock in use, with the result that the desired irregular porous surface is readily maintained while the tread is in service.

Having thus described my invention, what I claim and desire to protect by Letters Patent is:

1. An anti-skid tread composition for a pneumatic tire comprising, a thick layer of rubber composition adapted to extend over the crown portion of the tire, particles of water-soluble salt interspersed in said layer, and a thin coating of a composition of latex and glue interposed between the surface of the salt particles and the layer of rubber composition.

2. An anti-skid tread composition for a pneumatic tire comprising, a thick layer of rubber composition to cover the crown portion of the tire, particles of water-soluble inorganic halide salt interspersed in said layer, and a thin coating of a composition of butadiene-styrene copolymer latex and glue interposed between the surface of the salt particles and the layer of rubber composition.

3. An anti-skid tread composition for a pneumatic tire comprising, a thick layer of rubber composition for application over the crown portion of the tire, particles of water-soluble inorganic halide salt interspersed in said layer, the majority of said particles being of a size between a 10 and 20 mesh screen, and a thin coating of a latex and glue composition interposed between the surface of the salt particles and the layer of rubber composition.

4. An anti-skid tread composition for a pneumatic tire comprising, a thick layer of vulcanized rubber composition for application over the crown portion of the tire, particles of water-soluble inorganic halide salt interspersed in said layer, the quantity of salt particles in said tread being between 20% and 35% of the weight of the rubber composition of said tread, and a thin coating of a latex and glue composition interposed between the surface of the salt particles and the layer of rubber composition.

5. An anti-skid tread composition for a pneumatic tire comprising, a thick layer of rubber composition for application over the crown portion of the tire, particles of water-soluble inorganic halide salt interspersed in said layer, the majority of said particles being of a size between a 10 and 20 mesh screen, and the quantity of salt particles in said tread being between 20% and 35% of the weight of the rubber composition of said tread, and a thin coating of a composition of butadiene-styrene copolymer latex and glue containing substantially equal parts by weight of butadiene-styrene copolymer rubber and glue interposed between the surface of the salt particles and the layer of rubber composition.

6. A method of making an anti-skid rubber tread for pneumatic tires which includes the steps of coating water-soluble salt particles with a rubber latex and glue composition and thereafter incorporating the coated particles in rubber stock to be fabricated into a tire tread having an anti-skid surface formed by voiding of the salt particles from the surface of the tread.

7. A method of making an anti-skid rubber tread for pneumatic tires which includes the steps of coating water-soluble inorganic halide salt particles principally of 10 mesh to 20 mesh size with a composition comprising a mixture of rubber latex and glue and thereafter incorporating the coated particles in rubber stock to be fabricated into a tire tread having an anti-skid surface formed by voiding of the salt particles from the surface of the tread.

8. A method of making an anti-skid rubber tread for pneumatic tires which includes the steps of coating water-soluble inorganic halide salt particles principally of 10 mesh to 20 mesh size with a composition comprising a mixture of butadiene-styrene copolymer rubber latex and glue containing substantially equal parts by weight of butadiene-styrene copolymer rubber and glue, said composition being coated on the salt in amount equivalent to from 0.5 to 5% by weight of rubber and glue, based on the weight of the salt, and thereafter incorporating the coated particles in rubber stock to be fabricated into a tire tread having an anti-skid surface formed by voiding of the salt particles from the surface of the tread, the amount of said salt incorporated in the rubber stock being from 20 to 35% of the weight of the rubber stock.

ALFRED N. IKNAYAN.

REFERENCES CITED

The following references are of record in the file of this patent:

UNITED STATES PATENTS

| Number | Name | Date |
|---|---|---|
| 902,403 | Holloway | Oct. 27, 1908 |
| 1,106,985 | Stritzel | Aug. 11, 1914 |
| 1,416,796 | Davis | May 23, 1922 |
| 1,953,983 | Benner | Apr. 10, 1934 |
| 2,171,438 | Tarbox | Aug. 29, 1939 |
| 2,274,855 | Wallace | Mar. 3, 1942 |